United States Patent
Bennett

(10) Patent No.: US 6,752,360 B2
(45) Date of Patent: Jun. 22, 2004

(54) HYDRAULIC HOSE HOLDER FOR AN AGRICULTURAL IMPLEMENT

(75) Inventor: Robert Edwin Bennett, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/219,025

(22) Filed: Aug. 14, 2002

(65) Prior Publication Data

US 2004/0031888 A1 Feb. 19, 2004

(51) Int. Cl.⁷ ............................................. F16L 3/22
(52) U.S. Cl. ...................... 248/68.1; 24/16 R; 248/89
(58) Field of Search .................. 248/68.1, 89, 74.1, 248/62, 75, 49, 69, 51; 211/70, 85.13, 69.8; 24/16 R, 30.55; 137/351, 451, 355.16; 280/421

(56) References Cited

U.S. PATENT DOCUMENTS

| | | | | |
|---|---|---|---|---|
| 277,374 A | * | 5/1883 | Strohm | 174/111 |
| 2,017,088 A | * | 10/1935 | Bihler | 211/70 |
| 2,888,546 A | * | 5/1959 | Kinney | 392/441 |
| 3,476,868 A | * | 11/1969 | Williams et al. | 174/43 |
| 3,901,270 A | * | 8/1975 | Smith | 137/351 |
| 5,027,478 A | * | 7/1991 | Suhr | 24/16 R |
| 5,082,217 A | | 1/1992 | Parker et al. | 248/75 |
| 5,443,232 A | * | 8/1995 | Kesinger et al. | 248/62 |
| 5,742,982 A | * | 4/1998 | Dodd et al. | 24/16 R |
| 6,095,181 A | * | 8/2000 | Irwin | 137/351 |
| 6,375,017 B1 | * | 4/2002 | Schattner et al. | 211/85.13 |

OTHER PUBLICATIONS

John Deere Operator's Manual, "7200 Flex–Fold 16–Narrow–Row MaxEmerge 2 Drawn Planters", Cover page, Introduction p., 30–1 through 30–4, 1998.

* cited by examiner

Primary Examiner—Leslie A. Braun
Assistant Examiner—Tan Le

(57) ABSTRACT

A hydraulic hose holder comprises a vertically extending standard having a mounting plate, an arched clamping plate, arched resilient insert conforming to the clamping plate, and a circular disc. The arched clamping plate is secured to the mounting plate by screw jacks. The resilient insert is located between the mounting plate and the clamping plate. The resilient insert is provided with a circular opening having a series of radially extending slots. Each of the radially extending slots is provided with an enlarged opening for holding a hydraulic hoses or an electrical line. The hoses and electrical lines snap into the enlarged openings through the slots. The circular disc is placed in the circular opening trapping the hydraulic hoses and electrical lines in the enlarged openings.

18 Claims, 3 Drawing Sheets

HYDRAULIC HOSE HOLDER FOR AN AGRICULTURAL IMPLEMENT

FIELD OF THE INVENTION

It is an object of the present invention to provide a hydraulic hose holder that prevents chaffing of the hydraulic hoses by movement of an agricultural implement relative to the tractor.

BACKGROUND OF THE INVENTION

Hydraulic hose holders and electrical line holders for agricultural implements are well known in the art. The hoses and lines must be secured to prevent chaffing causing breakage. The hoses and lines have been secured in place by holders having clamps that are pivotally aligned with the vertical pivot axis of the agricultural implement.

SUMMARY OF THE INVENTION

It is an object of the present invention to provide a hydraulic hose holder that prevents chaffing of the hydraulic hoses by movement of an agricultural implement relative to the tractor.

The hydraulic hose holder of the present invention comprises a vertically extending standard that is aligned with the vertical pivot axis of the agricultural implement. The vertical standard is provided with a horizontal mounting plate. An arched clamping plate is secured to the mounting plate by screw jacks. A resilient insert is located between the mounting plate and the clamping plate. The resilient insert is provided with a circular opening having a series of radially extending slots. Some of the slots are designed for hydraulic hoses and some of the slots are designed for electrical lines. Each of the radially extending slots is provided with an enlarged opening for holding the respective hydraulic hoses or electrical line. The hoses and electrical lines snap into the enlarged pending. A circular disc is placed in the circular opening trapping the hydraulic hoses and electrical lines in the enlarged openings. The circular disc has a first portion and a second portion that is secured to the first portion by a fastener.

The hose holder of the present invention provides a simple method of routing and securing hydraulic hoses and electrical lines to a resilient insert. The hoses and lines are then clamped in place preventing their movement and undue chaffing.

DETAILED DESCRIPTION

Figure 1:
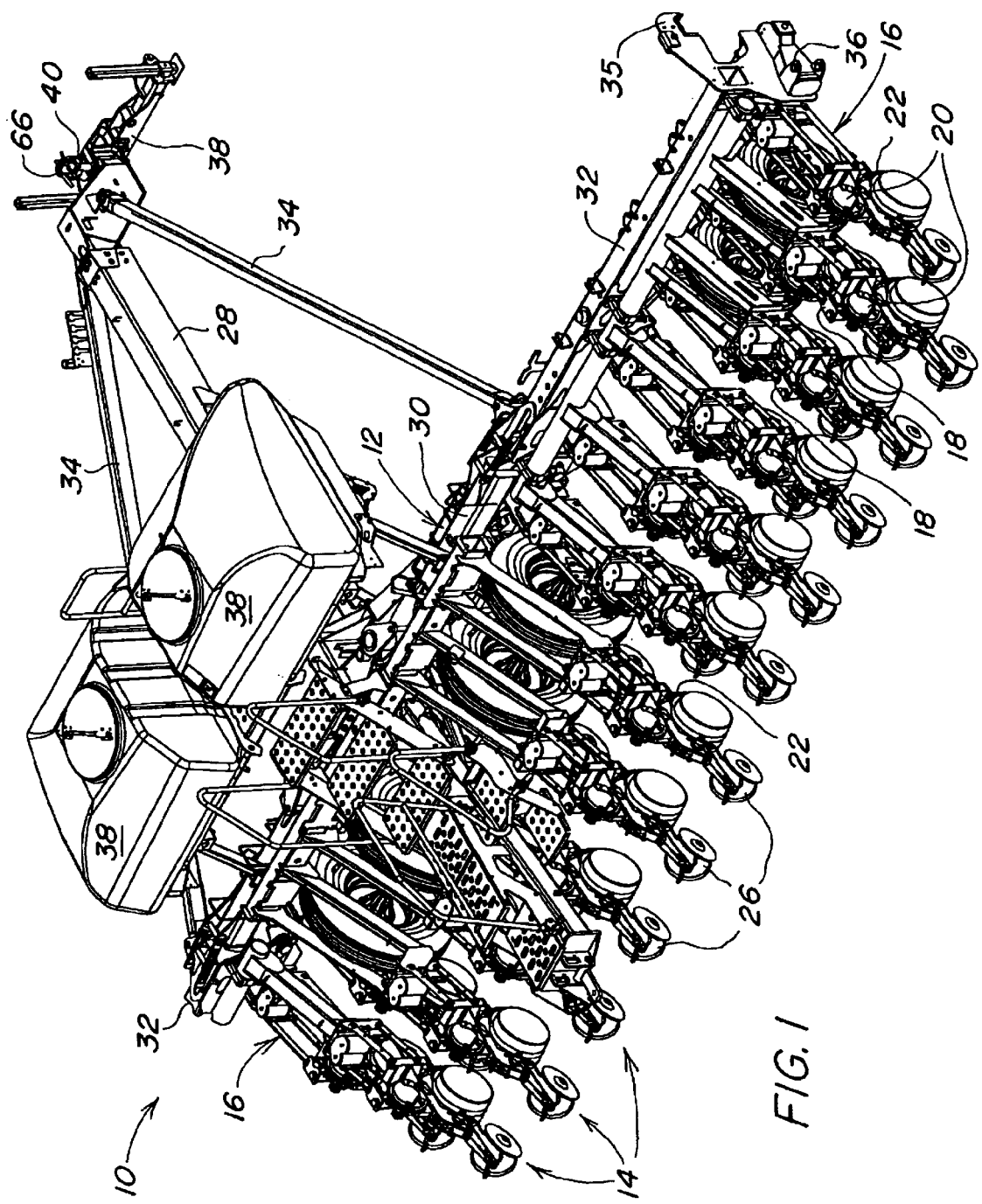
FIG. 1 is a rear perspective view of the seeding machine of the present invention in its working position.
Figure 2:
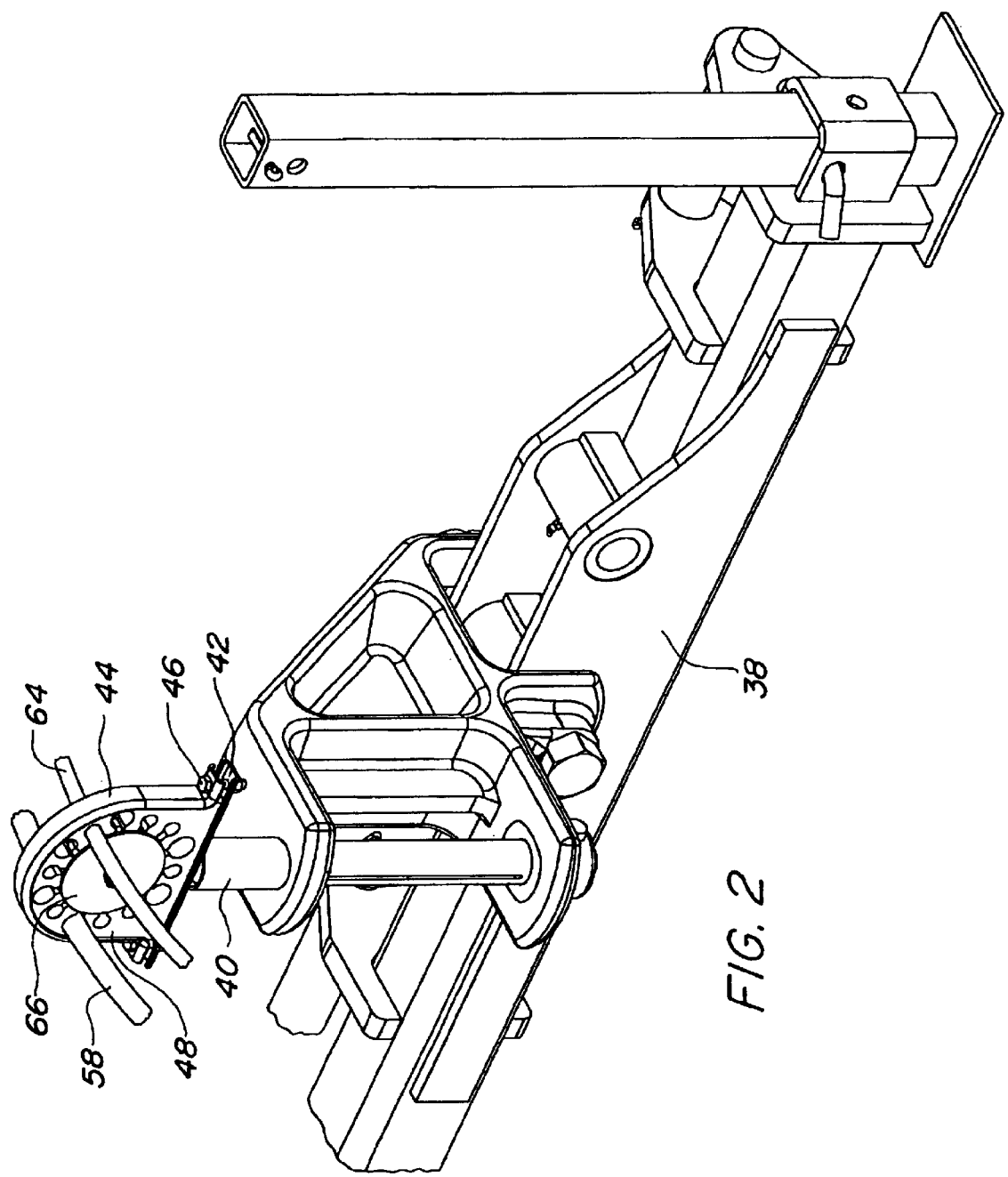
FIG. 2 is a rear perspective view of the hitch and hydraulic hose holder.
Figure 3:
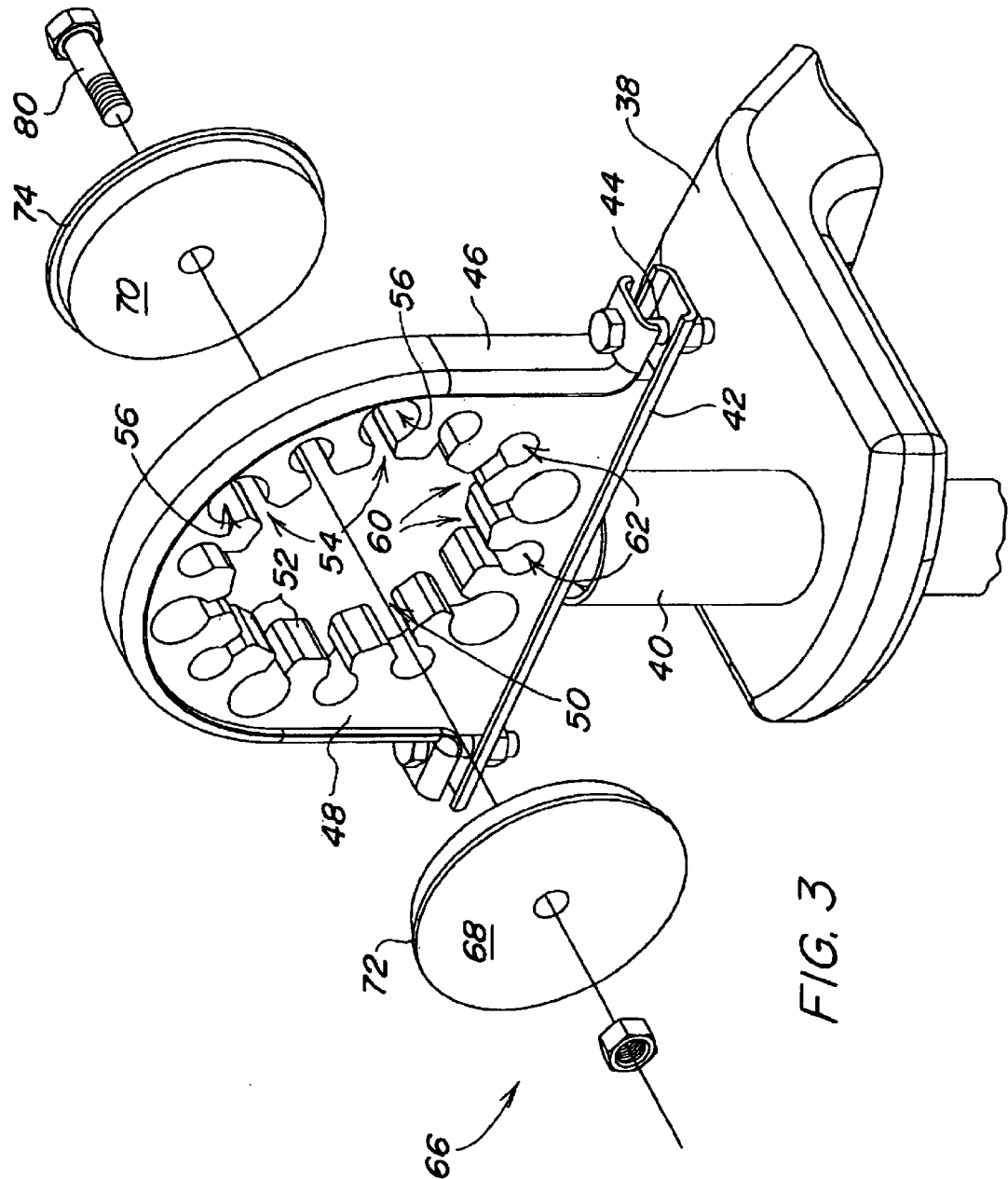
FIG. 3 is an exploded view of the hydraulic hose holder.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units 14 comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter 20 by a seed tube. A closing assembly 26 is used to close the planting furrow with the seed contained therein.

In the illustrated embodiment the seed meter 20 is a vacuum seed meter, although other types of seed meters using mechanical assemblies or positive air pressure could also be used with the subject invention.

The frame 12 has three segments a central segment 30 and two wing segments 32. The central segment 30 is coupled to a tractor by a telescoping drawbar 28. Wing segments 32 extend transversely outward from the central segment 30 when the seeding machine is in its working position illustrated in FIG. 1. Wing segments 32 are coupled to the drawbar 28 by draft links 34. The wing segments 32 are pivotally coupled to the central segment 30 by vertical pivots, so they can be forwardly folded into the seeding machine's transport position. The wing segments 32 are also pivotally coupled to the central segment 30 by horizontal pivot so the wing segments 32 can better follow the ground.

The transverse ends of the wing segments 32 are provided with hooks 35 for hooking to the telescoping draw bar 28 when the seeding machine is in its transport position. Row marker mounting brackets 36 are also located on the transverse ends of the wing segments 32. The row markers themselves have been eliminated for clarity purposes. The central segment 30 and the wing segments 32 are provided with ground support wheels. The ground support wheels are mounted to linkages having hydraulic cylinders that can be extended and retracted to raise and lower the planting units 14 relative to the ground.

The illustrated seeding machine 10 uses a pneumatic seed on demand delivery system to automatically transport seed from main hoppers 38 to the auxiliary hoppers 18. The pneumatic seed on demand delivery system and the vacuum seed meters 20 use pneumatic pressure generated by fans driven by hydraulic motors. As such, these hydraulic motors need pressurized hydraulic fluid to drive the fans. In addition, hydraulic cylinders on the implement also need pressurized hydraulic fluid to lift and fold the frame 12. The pressurized hydraulic fluid is supplied by hydraulic pumps on the tractor. The pressurized hydraulic fluid is transmitted through hydraulic hoses from the tractor to the various hydraulic motors and cylinders on the agricultural implement.

The drawbar 28 is provided with a hitch 38 which is pivotally coupled to the drawbar 28 by a pivot pin. The pivot pin defines a vertical pivot axis about which the drawbar 28 pivots relative to the hitch 38. A vertically extending standard 40 is mounted to the hitch 38 in line with the vertical pivot axis. The standard 40 is freely rotatable relative to the hitch 38. The standard 40 is provided with a horizontal mounting plate 42. An arched clamping plate 46 is mounted to the mounting plate 42 by screw jacks 44. An arched resilient insert 48 conforming to the arched clamping plate 46 is located between the clamping plate 46 and the mounting plate 42. The resilient insert 48 is formed from rubber. The resilient insert 48 is provided with a circular opening 50. The circular opening 50 having a circular edge 52. A series of hydraulic hose slots 54 extend radially outward from the circular edge 52 and are provided with enlarged openings 56 for holding a hydraulic hose 58. Similarly, a series of electrical line slots 60 extend radially outward from the circular edge 52. These electrical line slots 60 are provided with enlarged openings 62 for holding an electrical line 64.

The hydraulic hose 58 and electrical line 64 is held in pace by a circular disc 66 mounted in the circular opening 50 and contacting the circular edge 52. The disc 66 comprises a first portion 68 and a second portion 70. The first portion 68 has a circular lip 72 that engages the first side of the insert 48. The second portion 70 has a circular lip 74 that engages the second side of the insert 48. The first and second portions 68 and 70 are fastened together by mounting bolt 80 sandwiching the resilient insert between the first and second lips 72 and 74.

In securing the hydraulic hoses and electrical lines to the hose holder, the hydraulic hoses and electrical lines are inserted through their respective slots 54 and 60 in the resilient insert 48 to the enlarged openings 56 and 62. The first and second portions 68 and 70 of the disc 66 are then secured in the opening 50. The screw jacks 46 are then tightened to secure the hoses and lines to the holder.

Having described the preferred embodiment, it will become apparent that various modifications can be made without departing from the scope of the invention as defined in the accompanying claims.

What is claimed is:

1. A hydraulic hose holder for an agricultural implement, the hydraulic hose holder comprising:
   a standard;
   a mounting plate being mounted to the standard;
   a clamping plate being coupled to the mounting plate;
   a resilient insert being located between the mounting plate and the clamping plate, the resilient insert having an opening that is provided with an edge, a series of outwardly extending hydraulic hose slots extend outward from the edge of the opening, at least one of the hydraulic hose slots being provided with an enlarged opening for receiving a hydraulic hose;
   a disc being located in the opening engaging the edge and sealing the outwardly extending hydraulic hose slots.

2. A hydraulic hose holder as defined by claim 1 wherein the opening is circular and the hydraulic hose slots extend radially outward from the opening.

3. A hydraulic hose holder as defined by claim 2 further comprising jacks for drawing the clamping plate towards the mounting plate.

4. A hydraulic hose holder as defined by claim 3 wherein the clamping plate is arched to receive the resilient insert which is also arched.

5. A hydraulic hose holder as defined by claim 4 wherein the resilient insert has a first side and a second side, the disc has a first portion and a second portion that are fastened together, the first portion adjoining the first side of the resilient inert and the second portion adjoining the second side of the resilient inert.

6. A hydraulic hose holder as defined by claim 5 wherein the first portion of the disc is provided with a first circular lip that engages the first side of the resilient insert, and the second portion of the disc is provided with a second circular lip that engages the second side of the resilient insert.

7. A hydraulic hose holder as defined by claim 1 wherein the resilient insert has a first side and a second side, the disc has a first portion and a second portion that are fastened together, the first portion adjoining the first side of the resilient inert and the second portion adjoining the second side of the resilient inert.

8. A hydraulic hose holder as defined by claim 1 wherein the resilient insert is provided with electrical line slots extending outwardly from the opening for accommodating electrical lines.

9. An agricultural implement for performing an agricultural operation, the agricultural implement comprising:
   a frame having a drawbar, the drawbar having a hitch defining a vertical pivot axis;
   a hydraulic hose;
   a standard extending upwardly from the drawbar;
   a mounting plate being mounted to the standard;
   a clamping plate being coupled to the mounting plate;
   a resilient insert being located between the mounting plate and the clamping plate, the resilient insert having an opening with an edge, a series of outwardly extending hydraulic hose slots extend outward from the opening, at least one of the hydraulic hose slots being provided with an enlarged opening for receiving the hydraulic hose;
   a disc being located in the opening engaging the edge and sealing the radially extending hydraulic hose slots.

10. An agricultural implement as defined by claim 9 wherein the opening is circular and the hydraulic hose slots extend radially outward from the opening.

11. An agricultural implement as defined by claim 10 further comprising jacks for drawing the clamping plate towards the mounting plate.

12. An agricultural implement as defined by claim 11 wherein the clamping plate is arched to receive the resilient insert which is also arched.

13. An agricultural implement as defined by claim 12 wherein the resilient insert has a first side and a second side, the disc has a first portion and a second portion that are fastened together, the first portion adjoining the first side of the resilient insert and the second portion adjoining the second side of the resilient insert.

14. An agricultural implement as defined by claim 13 wherein the first portion of the disc is provided with a first circular lip that engages the first side of the resilient insert, and the second portion of the disc is provided with a second circular lip that engages the second side of the resilient insert.

15. An agricultural implement as defined by claim 9 wherein the resilient insert has a first side and a second side, the disc has a first portion and a second portion that are fastened together, the first portion adjoining the first side of the resilient inert and the second portion adjoining the second side of the resilient inert.

16. An agricultural implement as defined by claim 9 further comprising an electrical line, the resilient insert is provided with electrical line slots extending outwardly from the opening for accommodating the electrical line.

17. An agricultural implement as defined by claim 9 wherein the frame is provided with a furrow opener for forming a planting furrow.

18. An agricultural implement as defined by claim 17 wherein the frame is provided with a seed meter for metering seed and directing the metered seed to the planting furrow formed by the furrow opener.

* * * * *